(12) United States Patent
Lan

(10) Patent No.: US 7,219,918 B2
(45) Date of Patent: May 22, 2007

(54) STROLLER HAVING A BRAKE DEVICE

(76) Inventor: Red Lan, Taipei Hsien (TW)

( * ) Notice: Subject to any disclaimer, the term of this patent is extended or adjusted under 35 U.S.C. 154(b) by 323 days.

(21) Appl. No.: 11/051,379

(22) Filed: Feb. 4, 2005

(65) Prior Publication Data

US 2006/0175783 A1 Aug. 10, 2006

(51) Int. Cl.
*B62B 9/08* (2006.01)
(52) U.S. Cl. .................................... 280/642
(58) Field of Classification Search ........... 188/19, 188/20, 31, 69, 2 D, 2 F; 280/33.994, 47.38, 280/642
See application file for complete search history.

(56) References Cited

U.S. PATENT DOCUMENTS

| | | | |
|---|---|---|---|
| 4,116,464 A | * | 9/1978 | Haley .................... 280/647 |
| 4,567,964 A | * | 2/1986 | Kassai .................... 188/20 |
| 5,713,585 A | * | 2/1998 | Curtis et al. ............ 280/47.38 |
| 7,059,452 B2 | * | 6/2006 | Chen ...................... 188/20 |

FOREIGN PATENT DOCUMENTS

| | | |
|---|---|---|
| DE | 20106098 U1 | 9/2001 |
| ES | 2011702 A6 | 2/1990 |
| FR | 2648101 A1 | 12/1990 |
| GB | 59877 A | 12/1947 |
| GB | 2093540 A | 9/1982 |

* cited by examiner

*Primary Examiner*—Christopher P. Ellis
*Assistant Examiner*—Katy Meyer
(74) *Attorney, Agent, or Firm*—David N. Lathrop, Esq.; Gallagher & Lathrop

(57) ABSTRACT

A stroller includes a brake device. The brake device includes a control cable having a controlling end that is disposed on a stroller frame. The controlling end is operable to move a driving seat on a wheel seat to a braking position along a straight path. When the driving seat moves to the braking position, a swing arm of a swing member is rotated to an engagement position so as to engage one of a plurality of retaining grooves in a wheel, thereby preventing the rotation of the wheel.

8 Claims, 9 Drawing Sheets

STROLLER HAVING A BRAKE DEVICE

BACKGROUND OF THE INVENTION

1. Field of the Invention

This invention relates to a stroller, and more particularly to a stroller that has a brake device.

2. Description of the Related Art

Referring to FIGS. 1 and 2, a conventional stroller 1 is shown to include a stroller frame 11, two rear wheel units 12, two front wheel units (not shown) and a brake device 13. The stroller frame 11 has a pair of left and right leg rods 111 and two wheel seats 112. Each of the rear wheel units 12 includes a pair of left and right wheels 121, and an axle 122 extending through the wheels 121. The wheel seats 112 are mounted respectively to lower ends of the left and right leg rods 111. Each of the wheels 121 is formed with a plurality of angularly equidistant projecting rods 123 that are connected fixedly to a side thereof and that extend radially and outwardly from the axle 122. Each adjacent pair of the projecting rods 123 defines a retaining groove 124 therebetween. The brake device 13 includes two parallel swing rods 131 and a connecting rod 132 having two ends connected respectively and fixedly to the swing rods 131. The swing rods 131 are connected respectively and pivotally to the wheel seats 112 by two pivot pins 133. Each of the swing rods 131 is formed with a swing arm 134. Referring to FIG. 2, when the user steps down on the connecting rod 132 so as to move each of the swing rods 131 from a non-braking position shown by the solid lines to a braking position shown by the phantom lines, each of the swing arms 134 rotates to engage one of the retaining grooves 124, thereby preventing rotation of the wheels 121. This results in an inconvenient braking operation. That is, the user may experience inconvenience in performing the braking operation since the user must align his or her foot directly over the relatively small connecting rod 132 before stepping down on the same. The difficulties are compounded by the fact that the stroller frame 11 is commonly structured blocking the user's direct line of vision to the connecting rod 132.

SUMMARY OF THE INVENTION

The object of this invention is to provide a stroller that includes a control cable, which can be operated easily by hand to prevent wheel rotation of the stroller.

According to this invention, a stroller comprises:
a stroller frame with a leg rod;
a wheel unit mounted to a lower end of the leg rod and including an axle and a first wheel disposed on and rotatable about the axle, the first wheel being formed with a plurality of retaining grooves that are arranged along a circumferential direction thereof; and
a brake device including
a wheel seat for supporting the first wheel on the leg rod,
a reciprocating mechanism including a driving seat that is disposed movably on the wheel seat and that is movable along a straight path between a braking position and a non-braking position,
a control cable having a controlling end and a pulling end, the pulling end being fastened to the driving seat, the controlling end being disposed on the stroller frame and being operable to move the driving seat between the braking position and the non-braking position, and
a first swing member disposed rotatably on the wheel seat and including a first swing arm connected to the driving seat of the reciprocating mechanism such that movement of the driving seat relative to the wheel seat results in rotation of the first swing member relative to the wheel seat, and a second swing arm rotatable between an engagement position, where the driving seat is disposed at the braking position and where the second swing arm engages one of the retaining grooves in the first wheel so as to prevent rotation of the first wheel, and a disengagement position, where the driving seat is disposed at the non-braking position and where the second swing arm is removed from the first wheel so as to allow for the rotation of the first wheel.

BRIEF DESCRIPTION OF THE DRAWINGS

These and other features and advantages of this invention will become apparent in the following detailed description of a preferred embodiment of this invention, with reference to the accompanying drawings, in which.

DETAILED DESCRIPTION OF THE PREFERRED EMBODIMENT

Figure 1:
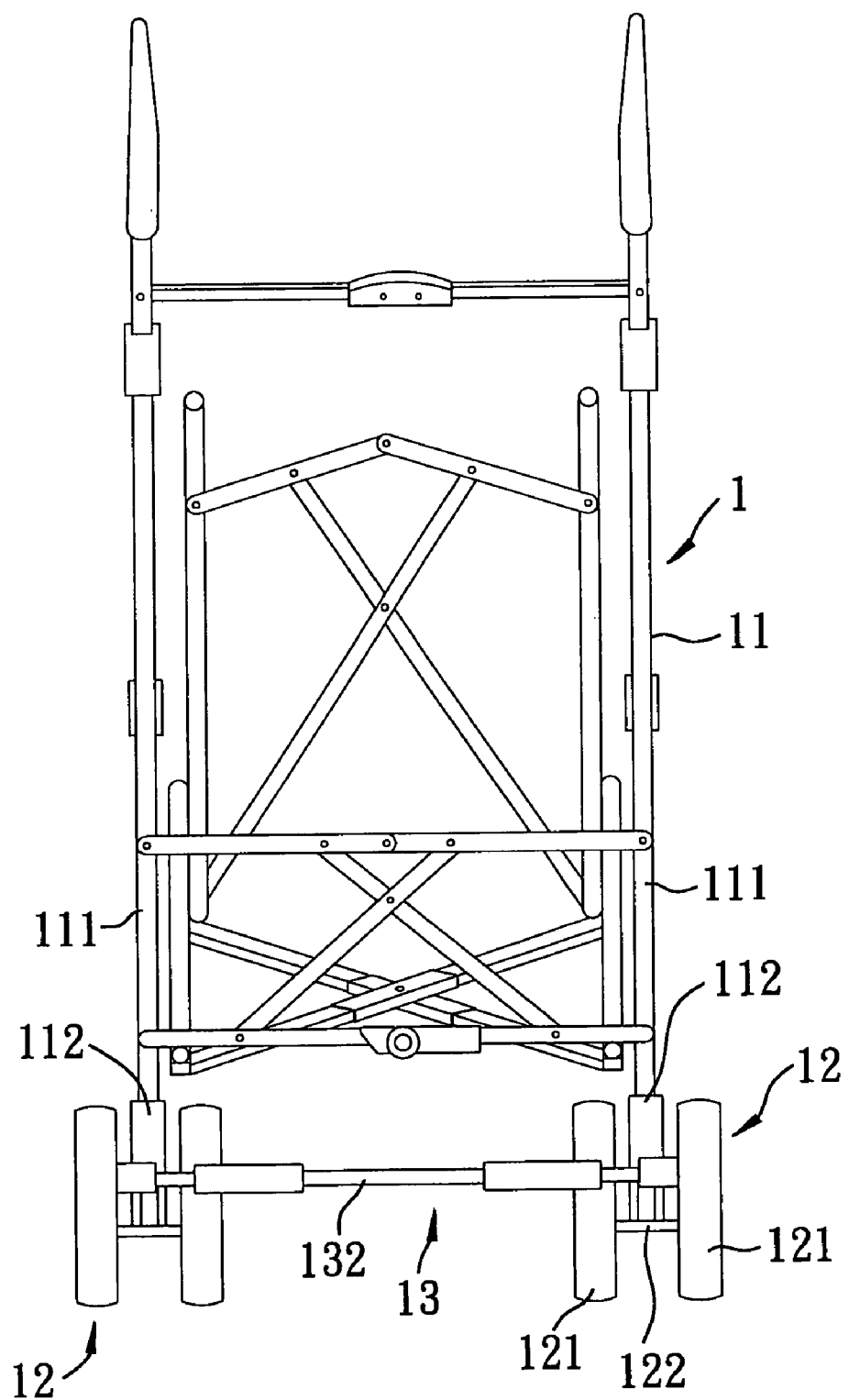
FIG. 1 is a rear view of a conventional stroller.
Figure 2:
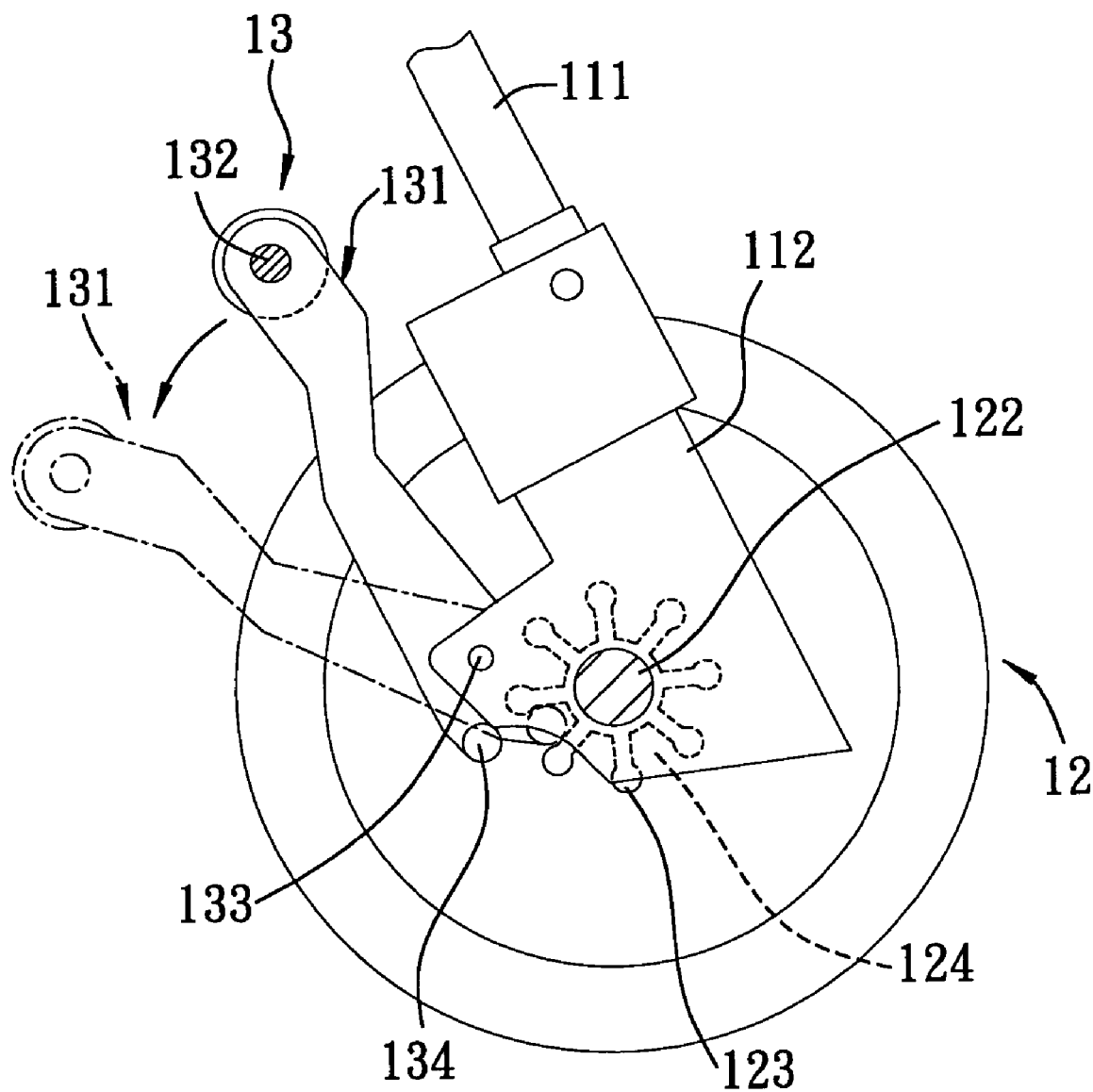
FIG. 2 is a fragmentary side view of the conventional stroller, illustrating connection between a wheel and a brake device.
Figure 3:
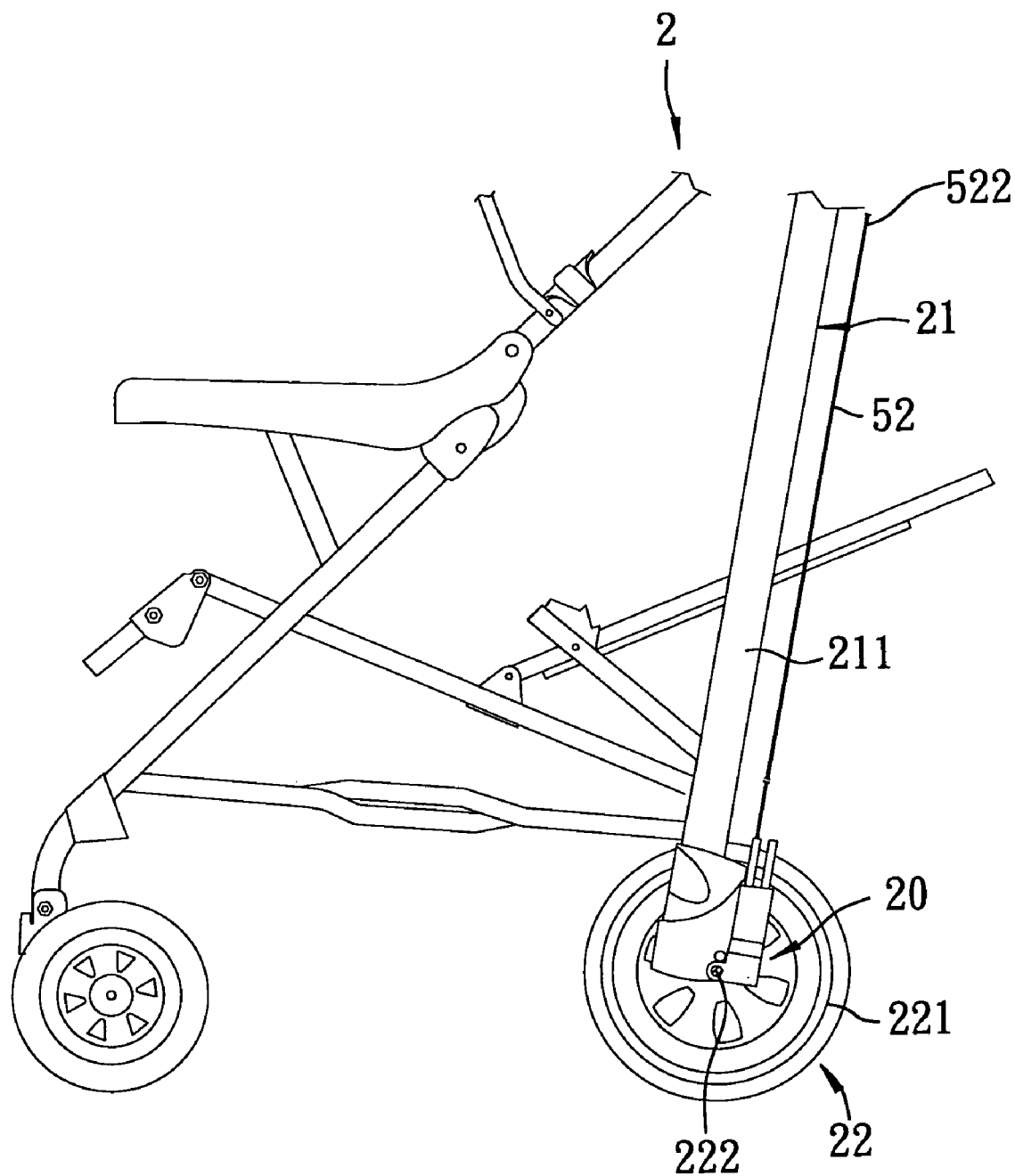
FIG. 3 is a fragmentary side view of the preferred embodiment of a stroller according to this invention.
Figure 4:
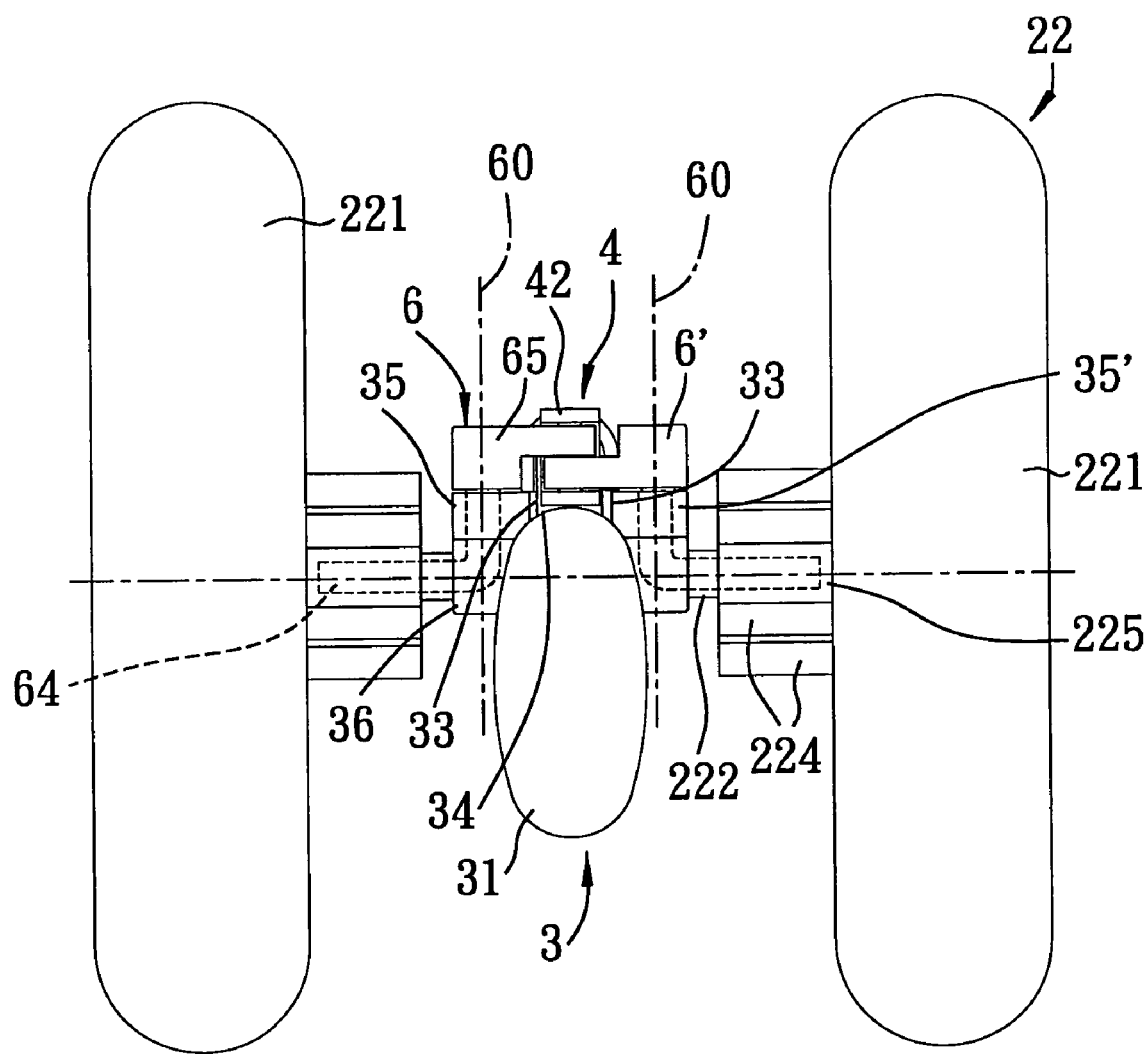
FIG. 4 is a fragmentary top view of the preferred embodiment, illustrating connection between a wheel unit and a brake device.
Figure 5:
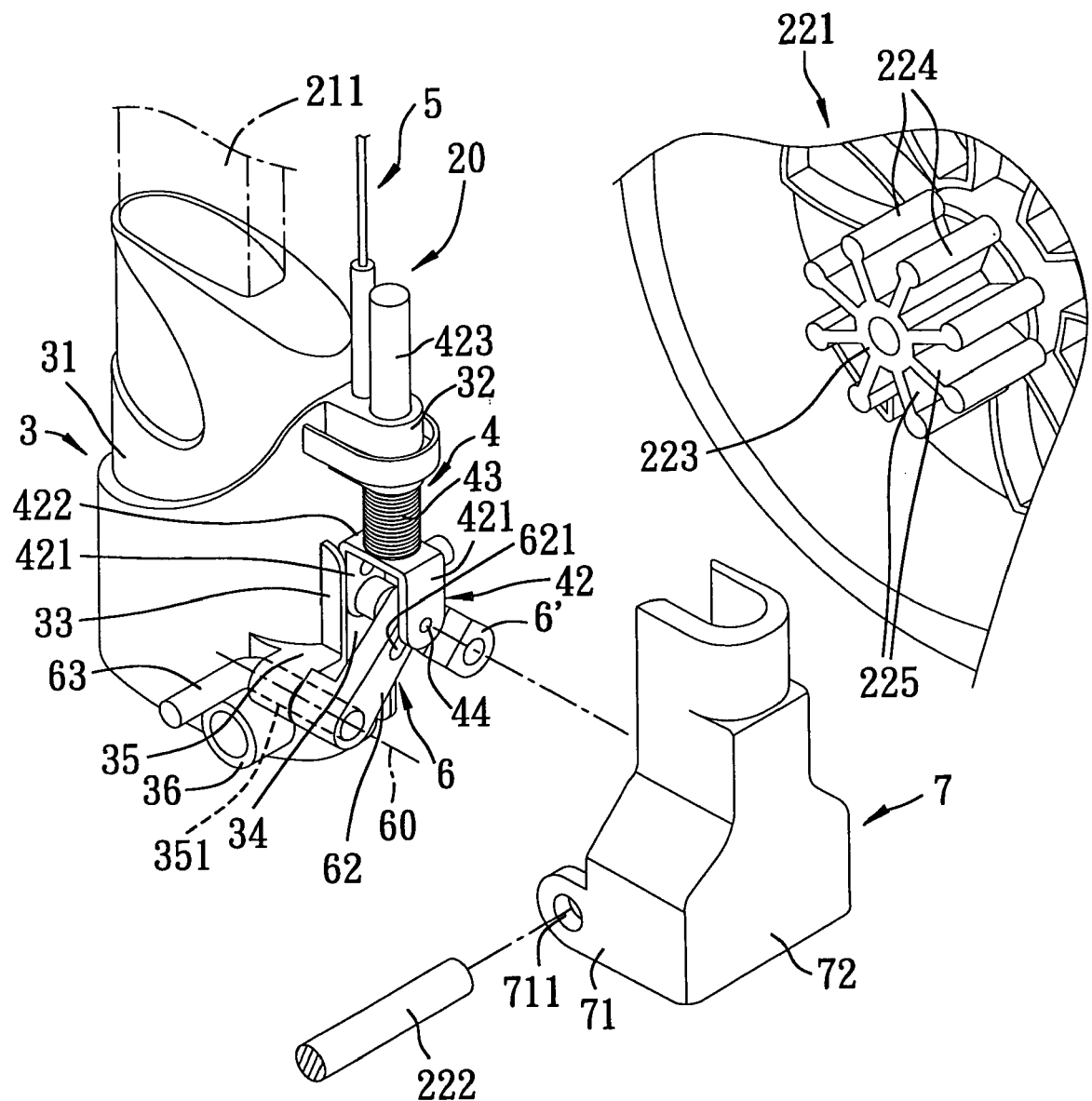
FIG. 5 is a partly exploded fragmentary perspective view of the preferred embodiment.

Referring to FIGS. 3, 4 and 5, the preferred embodiment of a stroller 2 according to this invention includes two brake devices 20, a stroller frame 21, two rear wheel units 22, and two front wheel units (not shown). The brake devices 20 are connected respectively to the wheel units 22. Since the structures of the brake devices 20 are similar to each other, only one is described hereinafter.

The stroller frame 21 is formed with two leg rods 211. The rear wheel units 22 are mounted respectively to lower ends of the leg rods 211. Each of the rear wheel units 22 includes a pair of first and second wheels 221 and an axle 222 interconnecting the first and second wheels 221. The first and second wheels 221 are rotatable about the axle 222. Each of the first and second wheels 221 includes a fixed tube 223 sleeved on the axle 222, and a plurality of angularly equidistant projecting rods 224 extending radially and outwardly from the fixed tube 223. The projecting rods 224 define a plurality of retaining grooves 225, which are arranged along a circumferential direction of a corresponding one of the first and second wheels 221.

The brake device 20 includes a wheel seat 3, a reciprocating mechanism 4, a control cable unit 5, a first swing member 6, a second swing member 6' and a cover 7.

Figure 6:
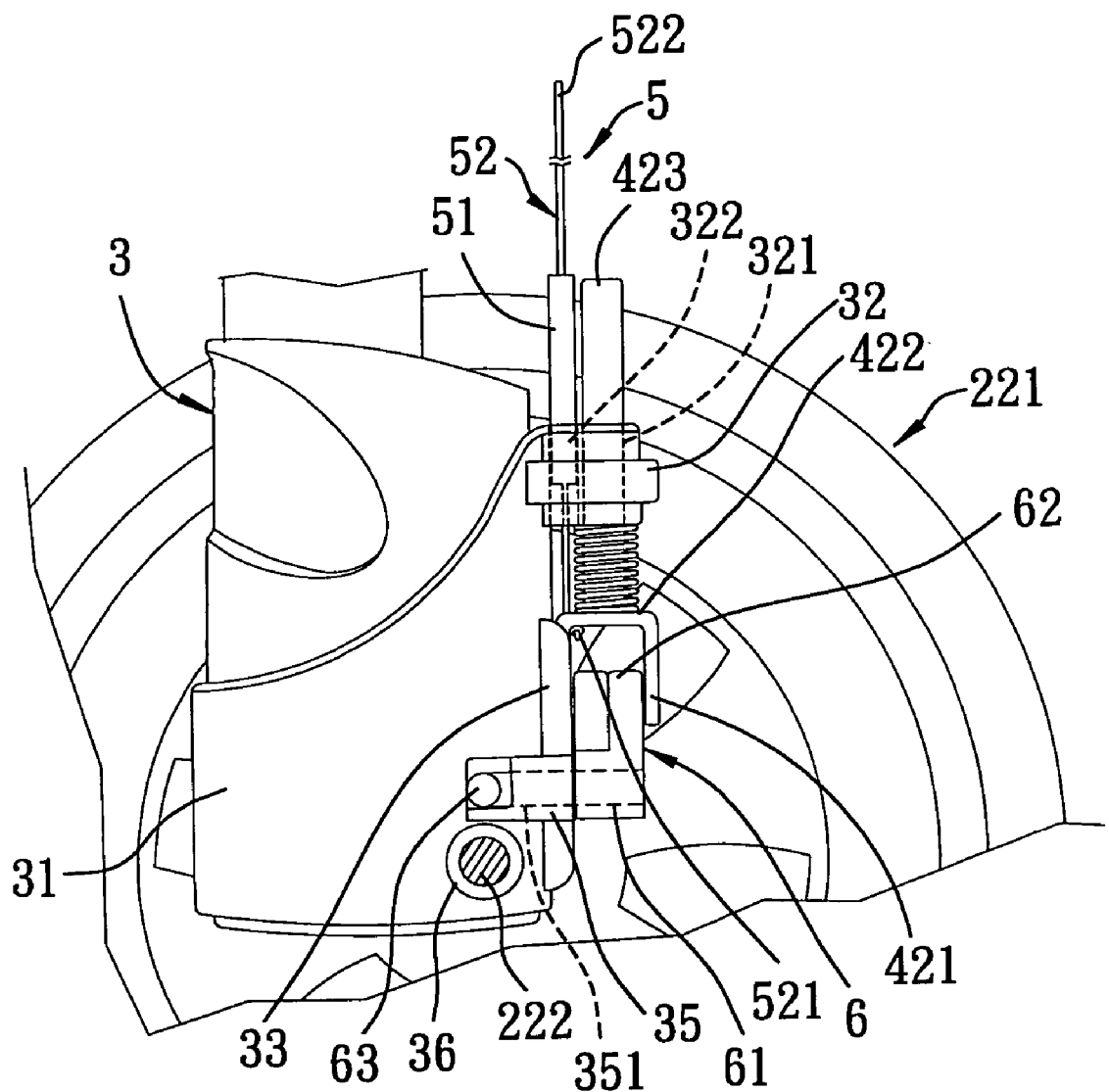
FIG. 6 is a fragmentary side view of the preferred embodiment, illustrating a braking state of the brake device.

The wheel seat 3 supports a corresponding one of the rear wheel units 22 on the corresponding leg rod 211, and includes a socket portion 31 for receiving a lower end of the corresponding leg rod 211, a guiding portion 32, two fixed parallel guiding plates 33 defining a guide path 34 therebetween, a first bearing portion 35, a second bearing portion 35' and an axle tube portion 36. The axle 222 extends through the axle tube portion 36. The guiding portion 32 has an upright guide hole 321 and an upright cable hole 322 that are formed therethrough, as shown in FIG. 6. Each of the first and second bearing portions 35, 35' is formed with a hole 351 therethrough.

Figure 7:
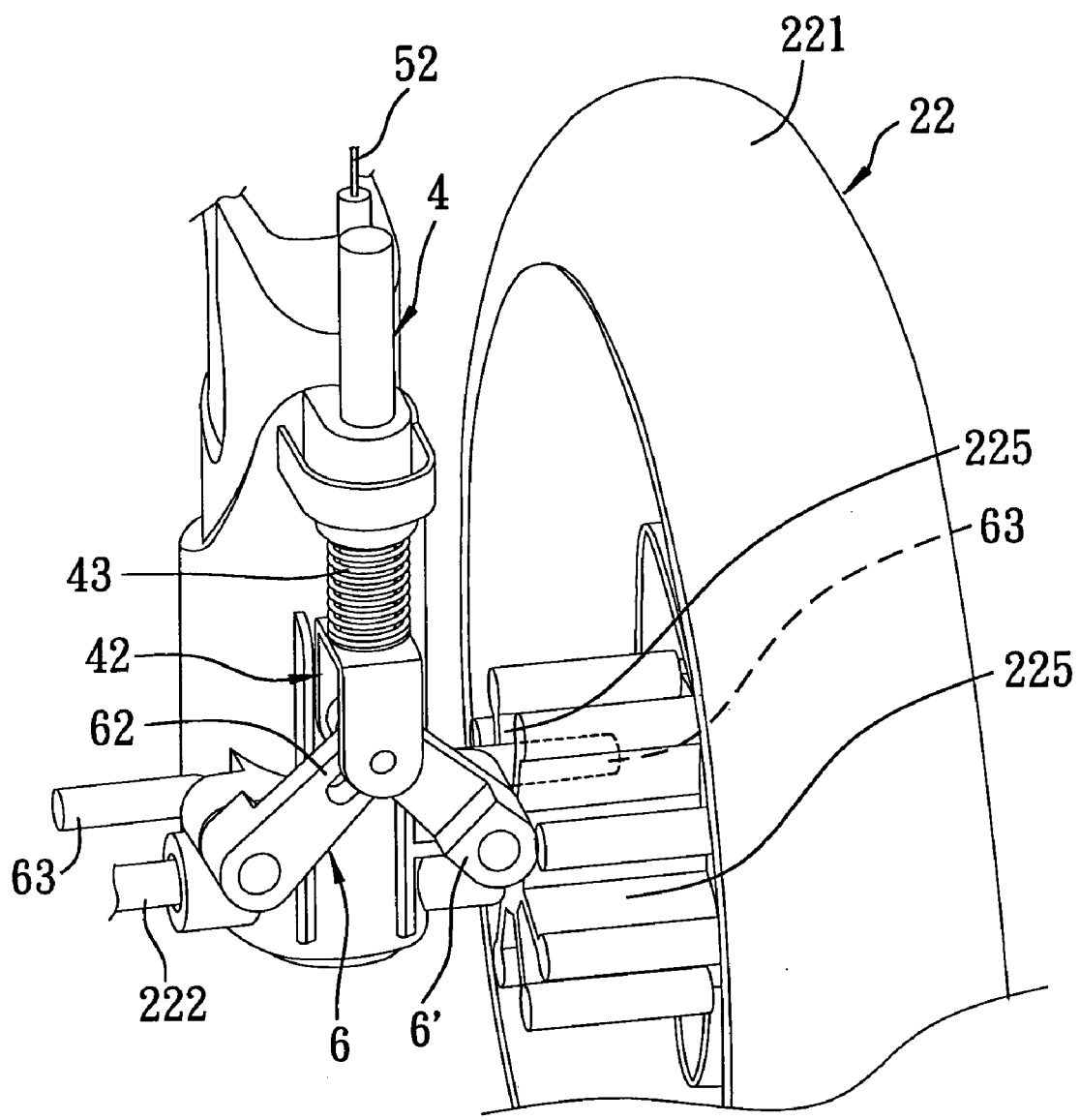
FIG. 7 is a fragmentary perspective view of the preferred embodiment, illustrating the braking state of the brake device.
Figure 8:
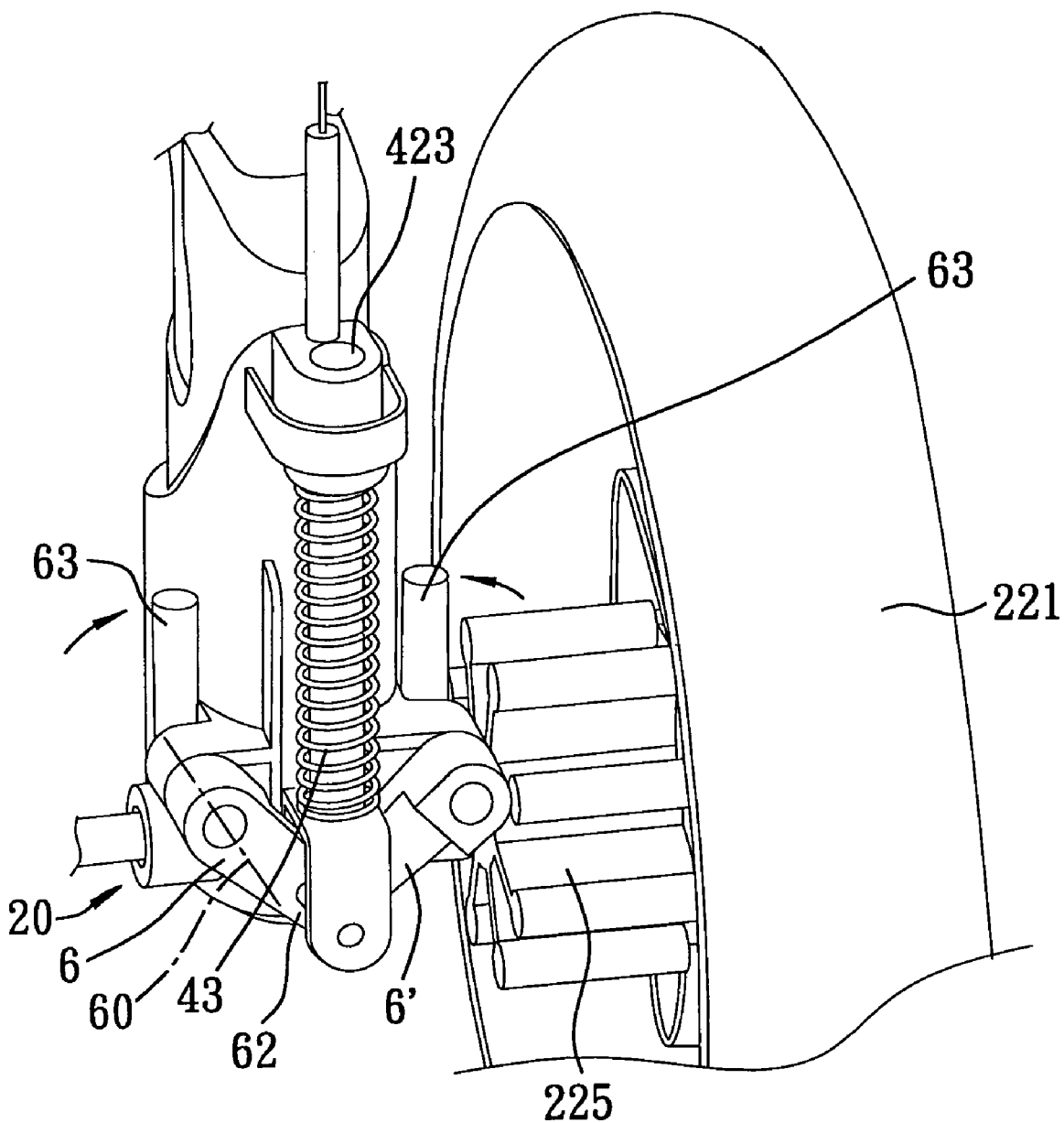
FIG. 8 is a fragmentary perspective view of the preferred embodiment, illustrating a non-braking state of the brake device.
Figure 9:
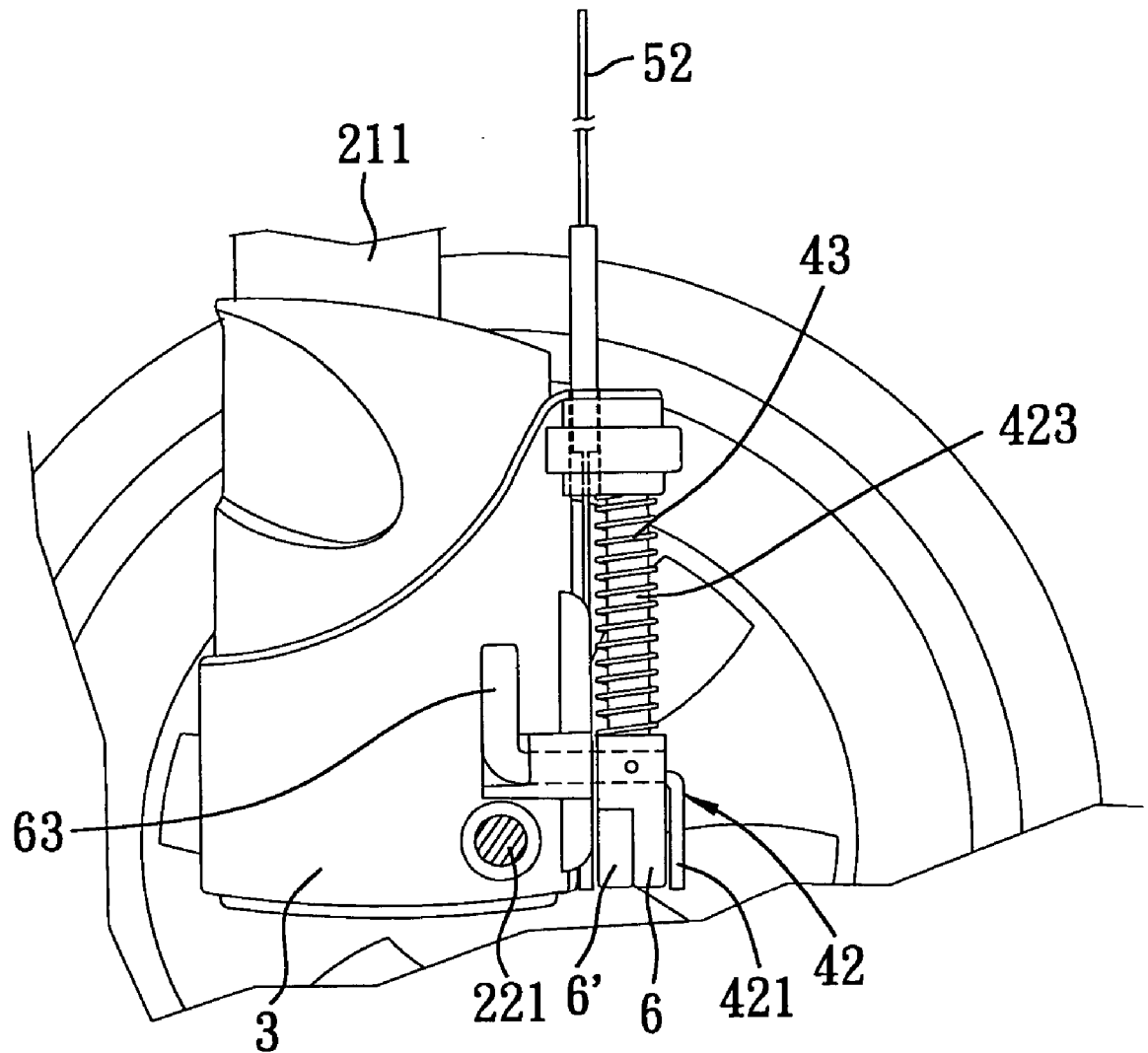
FIG. 9 is a fragmentary side view of the preferred embodiment, illustrating the non-braking state of the brake device.

The reciprocating mechanism 4 includes a driving seat 42 movable on the wheel seat 3 between a braking position shown in FIGS. 6 and 7 and a non-braking position shown in FIGS. 8 and 9, a resilient member 43 configured as a coiled compression spring, and a pin 44. The driving seat 42 includes a U-shaped plate consisting of two parallel side plate portions 421 and a top plate portion 422, and a guiding rod 423 having a lower end connected fixedly to a top surface of the top plate portion 422. The top plate portion 422 has two ends that are connected respectively and fixedly to upper ends of the side plate portions 421. The guiding rod 423 extends through the guide hole 321 in the guiding portion 32 of the wheel seat 3 so as to guide the driving seat 3 to move along a straight path. The guiding plates 33 of the wheel seat 3 flank one of the side plate portions 421 so as to further guide the driving seat 42 to move along the straight path. The resilient member 43 is sleeved on the guiding rod 423 between the guiding portion 32 and the top plate portion 422 so as to bias the driving seat 42 to move to the non-braking position in a direction away from the guiding portion 32. The pin 44 extends through and is fixed between the side plate portions 421.

The control cable unit 5 includes a sleeve 51 disposed within the cable hole 322 of the wheel seat 3, and a control cable 52 extending through the sleeve 51. The control cable 52 has a pulling end 521 fastened to the top plate portion 422 of the driving seat 42, and a controlling end 522. The controlling end 522 is disposed on the stroller frame 21. For example, the controlling end 522 is mounted on a handle (not shown) of the stroller 2. The controlling end 522 can be operated to pull the driving seat 42 upwardly against the biasing action of the resilient member 43 to the braking position.

The first and second swing members 6, 6' are disposed respectively and rotatably on the first and second bearing portions 35, 35', and are rotatable about a horizontal rotating axis 60 that is perpendicular to the axle 222. Each of the first and second swing members 6, 6' includes a rotating shaft portion 61, a first swing arm 62 extending perpendicularly from an end of the rotating shaft portion 61, and a second swing arm 63 extending perpendicularly from an opposite end of the rotating shaft portion 61. The rotating shaft portions 61 are journalled respectively within the holes 351 in the first and second bearing portions 35, 35'. Each of the first swing arms 62 has a slide slot 621 (see FIG. 5) formed therethrough and extending along a longitudinal direction thereof. The pin 44 is received slidably within the slide slots 621 in the first and second swing arms 62. Therefore, movement of the driving seat 42 relative to the wheel seat 3 results in rotation of the first and second swing members 6, 6' relative to the wheel seat 3. As such, each of the second swing arms 63 is rotatable between an engagement position and a disengagement position. In the engagement position, the driving seat 42 is disposed at the braking position, and the corresponding second swing arm 63 engages one of the retaining grooves 225 in the corresponding one of the first and second wheels 221 to prevent rotation of the corresponding one of the first and second wheels 221 so that the brake device 20 is in a braking state. In the disengagement position, the driving seat 42 is disposed at the non-braking position, and the corresponding second swing arm 63 is removed from the corresponding one of the first and second wheels 221 so that the brake device 20 is in a non-braking state, thereby allowing for the rotation of the first and second wheels 221.

The cover 7 is disposed on the wheel seat 3 for covering the reciprocating mechanism 4 and the first and second swing members 6, 6'. The cover 7 has two side walls 71 and a rear wall 72. The axle 222 extends through holes 711 in the side walls 71.

Referring to FIGS. 6 and 7, when the pulling end 521 of the control cable 52 is moved upwardly, the driving seat 42 turns the first swing arms 62 of the first and second swing members 6, 6' upwardly. This causes the second swing arms 63 of the first and second swing members 6, 6' to pivot downwardly to the engagement positions.

Referring to FIGS. 8 and 9, when the control cable 52 is released, the resilient member 43 pushes the driving seat 42 downwardly. Hence, the first swing arms 62 pivot downwardly so as to turn the second swing arms 63 upwardly, thereby removing the second swing arms 63 from the first and second wheels 221.

As such, to change the brake device 20 between the braking state and the non-braking state, it is only necessary to operate a controller (not shown) on the stroller frame 21 with one hand. This is a convenient operation. Since the specific structure of the controller is known in the art and is not pertinent to the claimed invention, a detailed description thereof will be omitted herein for the sake of brevity.

With this invention thus explained, it is apparent that numerous modifications and variations can be made without departing from the scope and spirit of this invention. It is therefore intended that this invention be limited only as indicated by the appended claims.

I claim:

1. A stroller comprising:
    a stroller frame with a leg rod;
    a wheel unit mounted to a lower end of said leg rod and including an axle and a first wheel disposed on and rotatable about said axle, said first wheel being formed with a plurality of retaining grooves that are arranged along a circumferential direction thereof; and
    a brake device including
        a wheel seat for supporting said first wheel on said leg rod,
        a reciprocating mechanism including a driving seat that is disposed movably on said wheel seat and that is movable along a straight path between a braking position and a non-braking position,
        a control cable having a controlling end and a pulling end, said pulling end being fastened to said driving seat, said controlling end being disposed on said stroller frame and being operable to move said driving seat between said braking position and said non-braking position, and
        a first swing member disposed rotatably on said wheel seat and including a first swing arm connected to said driving seat of said reciprocating mechanism such that movement of said driving seat relative to said wheel seat results in rotation of said first swing member relative to said wheel seat, and a second swing arm rotatable between an engagement position, where said driving seat is disposed at said braking position and where said second swing arm engages one of said retaining grooves in said first wheel so as to prevent rotation of said first wheel, and a disengagement position, where said driving seat is disposed at said non-braking position and where said second swing arm is removed from said first wheel so as to allow for the rotation of said first wheel.

2. The stroller as claimed in claim 1, wherein said first swing member is rotatable about a horizontal rotating axis that is perpendicular to said axle.

3. The stroller as claimed in claim 1, wherein said wheel seat has a guiding portion that is formed with a guide hole, said driving seat including a U-shaped plate and a guiding rod, said U-shaped plate having two parallel upright side plate portions and a top plate portion interconnecting upper ends of said side plate portions and having a top surface connected fixedly to a lower end of said guiding rod, said guiding rod extending through said guide hole in said guiding portion of said wheel seat so as to guide said driving seat to move along said straight path.

4. The stroller as claimed in claim 3, wherein said reciprocating mechanism further includes a resilient member disposed between said guiding portion of said wheel seat and said top plate portion of said U-shaped plate of said driving seat so as to bias said driving seat to move to said non-braking position in a direction away from said guiding portion of said wheel seat.

5. The stroller as claimed in claim 3, wherein said wheel seat further includes two fixed parallel guiding plates that flank one of said side plate portions of said U-shaped plate of said driving seat so as to further guide said driving seat to move along said straight path.

6. The stroller as claimed in claim 3, wherein said guiding portion of said wheel seat is formed with a cable hole therethrough, said control cable extending through said cable hole and being fastened to said top plate portion of said U-shaped plate of said driving seat at said pulling end.

7. The stroller as claimed in claim 3, wherein said first swing arm of said first swing member has a slide slot formed therethrough and extending along a longitudinal direction of said first swing arm, said reciprocating mechanism further including a pin that is fixed between said side plate portions of said U-shaped plate of said driving seat and that is received slidably within said slide slot in said first swing member.

8. The stroller as claimed in claim 1, wherein said wheel unit further includes a second wheel that is formed with a plurality of retaining grooves which are arranged along a circumferential direction thereof, said brake device further including a second swing member disposed rotatably on said wheel seat, said second swing member including a first swing arm connected to said driving seat such that the movement of said driving seat relative to said wheel seat results in rotation of said second swing member relative to said wheel seat, and a second swing arm rotatable between an engagement position, where said driving seat is disposed at said braking position and where said second swing arm of said second swing member engages one of said retaining grooves in said second wheel so as to prevent rotation of said second wheel, and a disengagement position, where said driving seat is disposed at said non-braking position and where said second swing arm is removed from said second wheel so as to allow for the rotation of said second wheel.

* * * * *